United States Patent [19]
Lessley et al.

[11] Patent Number: 5,390,701
[45] Date of Patent: Feb. 21, 1995

[54] FILTER VALVE ASSEMBLY

[76] Inventors: Michael R. Lessley, 1500 Broadview Dr., Glendale, Calif. 91208; Larry P. Henry, 225 N. Loara, Anaheim, Calif. 92801

[21] Appl. No.: 224,268

[22] Filed: Apr. 6, 1994

[51] Int. Cl.[6] ............................................. B10D 35/02
[52] U.S. Cl. ................................... 137/549; 210/430; 210/440
[58] Field of Search ..................... 210/430, 440, 130; 137/549

[56] References Cited

U.S. PATENT DOCUMENTS

| | | | |
|---|---|---|---|
| 4,832,844 | 8/1989 | Ayers | 210/440 |
| 4,872,976 | 10/1989 | Cudaback | 210/440 |
| 4,959,141 | 9/1990 | Anderson | 210/430 |
| 5,049,269 | 9/1991 | Shah | 137/549 |
| 5,250,176 | 10/1993 | Daniel | 210/440 |

*Primary Examiner*—A. Michael Chambers
*Attorney, Agent, or Firm*—Wagner & Middlebrook

[57] ABSTRACT

A housing for use with a removable filter element includes fluid inlet passages and a fluid outlet passage, a plurality of arcuate slots arranged in a generally circular pattern on the housing, the housing including a valve body with bolts passing through the slots securing the valve body to the housing. A threaded boss is formed on the valve body for attachment of a filter element. A number of ports are formed on the valve body in registery with the fluid inlet passages for supplying fluid to the filter element. The boss includes a passageway therethrough communicating with the outlet passage and a check valve in the passageway. A seal is positioned between the housing and the valve body. Turning the filter element in a direction to remove it causes an initial rotation of the bolts in the slots resulting in misalignment of the ports and the fluid inlet passages, blocking flow to the ports.

16 Claims, 4 Drawing Sheets

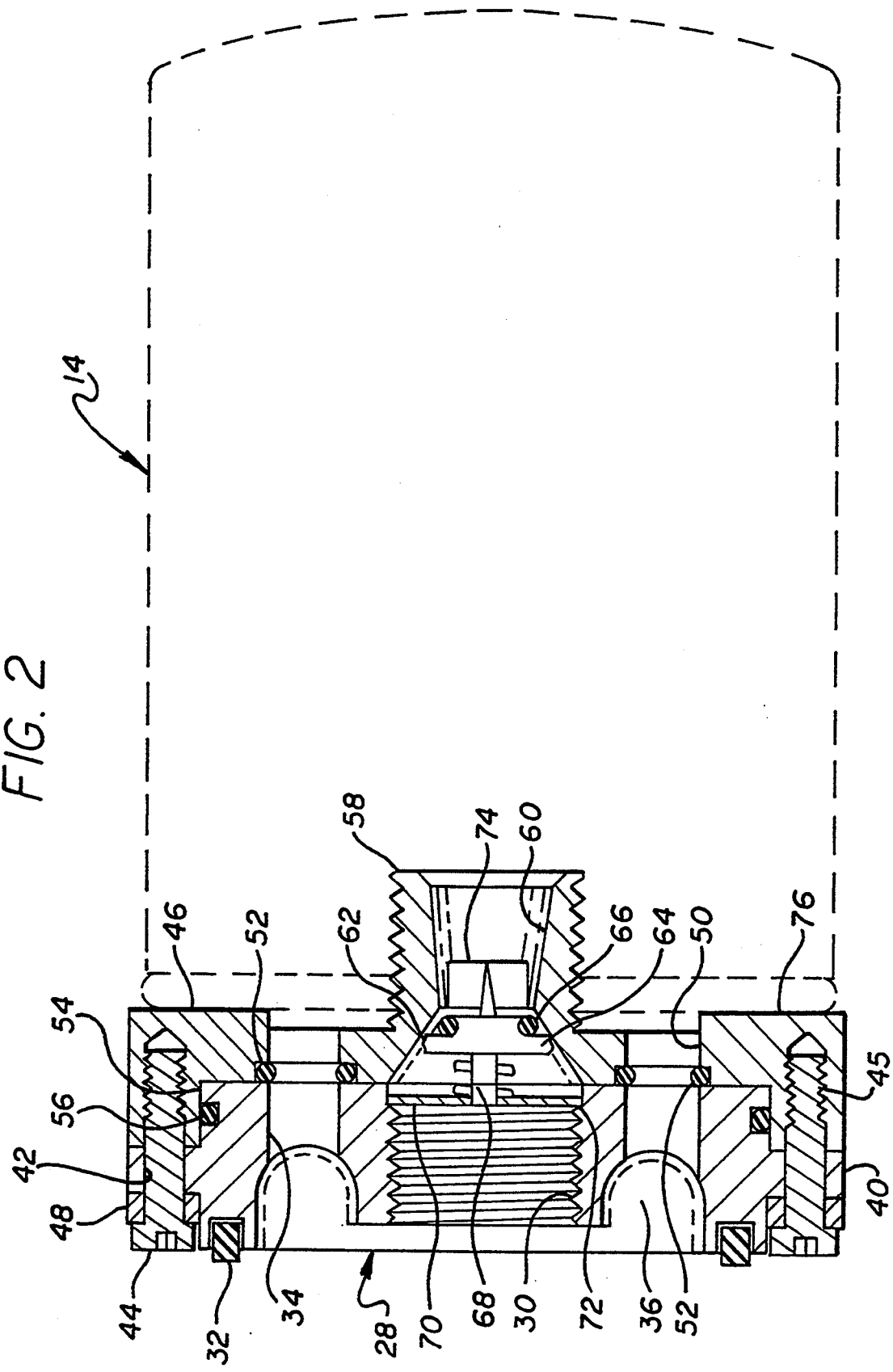

FILTER VALVE ASSEMBLY

BACKGROUND OF THE INVENTION

This invention relates to valves and more particularly to a valve configuration for use with retail gasoline pumps for avoiding or minimizing product loss when a filter element is changed.

The usual filter which is used to filter gasoline flowing out of a service station pump to an automobile gas tank or other container is similar to those commonly used for filtering motor oil in an engine and includes a flange with internal threads which screw on a threaded post or boss which includes an outlet passage. The flange is permanently attached to a cylindrical can or container which contains a filter member. A series of ports in the flange communicate with a source of gasoline under pressure which then flows across the filter and out the outlet passage to a meter unit and then to the hose. Such filter elements need to be replaced at intervals of one to several months depending on the volume of gasoline flowing through the pump and possible sources of contamination.

Each time the filter is changed, a large amount (usually more than a gallon) of product is lost to the ground or to the air. This is because the filter is usually mounted horizontally to the meter unit and when the filter is removed, the pressure in the line, metering unit and filter forces the product to flow out of the filter and onto the ground.

Current state and federal air and water regulations state that this product (gasoline or diesel fuel) must be contained and must not escape to the air or soil. There are currently no valves available in the industry which enable a service station operator to comply with these regulations.

BRIEF DESCRIPTION OF THE INVENTION

Applicants have designed a valve structure for use with filter assemblies in service station pumps which is inexpensive, quite compact so that it can be installed in existing equipment, and which positively closes off flow from upstream of the filter, thereby minimizing the loss of petroleum product to the air or ground. The valve structure is made for both horizontally and vertically mounted filter elements. Where the filter element is mounted vertically there is almost no loss whatever of petroleum product since that in the filter element remains contained when the filter element is removed. Where a horizontally mounted filter element is used, a small loss is experienced because of leakage from the container during removal before the element can be turned upright. This loss is a very small fraction of that experienced where no valve structure of the type described herein is used.

With respect to all embodiments described herein, it is an object of the invention to provide a valve which shuts off the flow of product to and from the filter.

It is another object to provide a valve which is compact in size to fit in the limited space available in the petroleum dispensers and easily adapts to existing pumping and filtering equipment.

It is another object to provide a valve which, when closed, has a minimum amount of product left on the filter side of the valve which could escape to the environment.

It is a further object to provide a valve which automatically opens and closes during the process of removing and installing the filter element.

It is an object of an embodiment of the invention to provide a valve which, when closed, isolates the filter from the pressurized line and bypasses the product directly to the dispenser.

It is an object of an embodiment of the invention to provide a valve which positions the filter in a vertical position to reduce the amount of product spillage during a filter change.

It is a still further object to provide a valve which includes a deflector which deflects any lost product away from the operator.

It is a still further object to provide a valve which is used as a diagnostic tool to determine if the filter element is plugged, clogged or defective prior to its removal.

BRIEF DESCRIPTION OF THE DRAWINGS

FIG. 2 is a sectional view through a valve according to the invention;

DESCRIPTION OF THE PREFERRED EMBODIMENT

Figure 1:
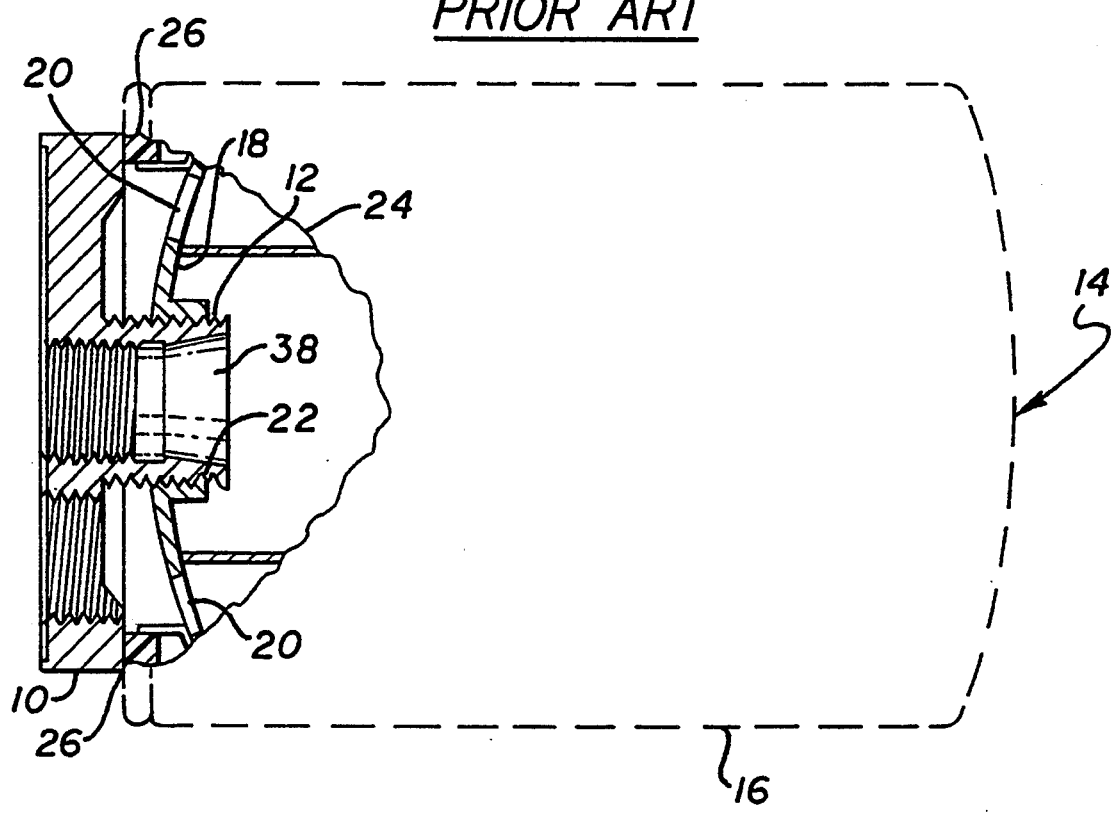
FIG. 1 is a view partly in section of a prior art filtering arrangement for filtering petroleum fuel showing a fixture attached to or immediately downstream of the metering unit to which a filter element is attached.

FIG. 1 is a view of a prior art filtering system wherein a fixture 10 having an external threaded boss 12 is attached to, or is part of, a metering unit, not shown. A conventional disposable filter element 14 includes a generally cylindrical can 16 closed at one end and a plate 18 secured to the can having inlet passages 20 and an internally threaded outlet port 22 separated by means of a filtering member 24. A flange 25 is fastened to plate 18 and carries an annular seal 26 sealing against a flat surface of fixture 10 when the filter element 14 is screwed onto the threaded boss 12.

When the filter element 14 is in service there is a significant fluid pressure existing within the filter element and in the metering structure nearby. When it becomes necessary to change the filter element it is not always convenient to take the time to depressurize the system, hence, the product in the filter and the adjoining structure tends to squirt out around the base of the filter element causing a significant loss of product to the air and the ground and possibly spraying the individual changing the filter. While this is obviously undesirable, there has been no available structure which can be housed within the available space in the fuel dispenser capable of eliminating the problem.

Applicants have devised a valve structure of limited size which fits conveniently between the fixture 10 and the filter element 14. It operates such that the initial turning of the filter element to remove the element results in rotating a plate to a position where, in one embodiment, it blocks flow and pressure from the upstream side of the filter inlet ports and, in another embodiment, bypasses the inlet flow directly to the outlet port.

Figure 3:
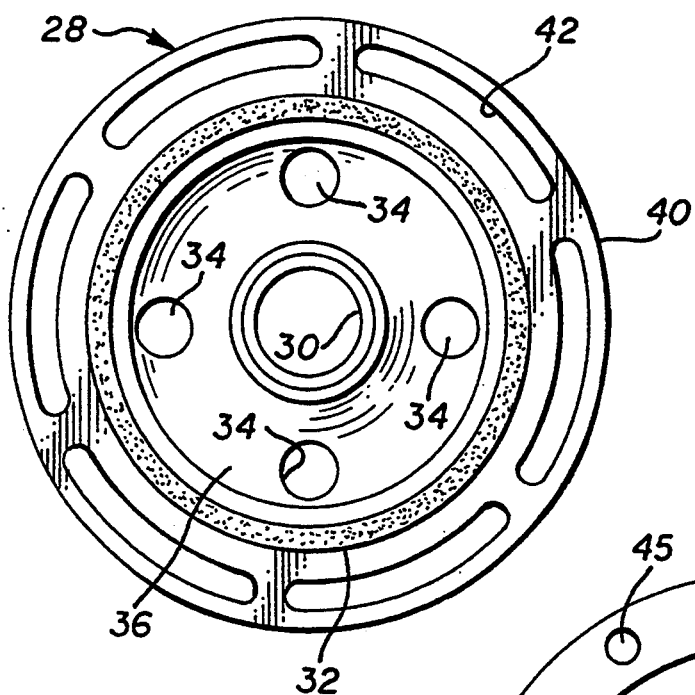
FIG. 3 is a left side elevational view of the valve of FIG. 2.

FIG. 2 is a cross sectional view of a valve structure according to the invention. A housing member 28 which is preferably of generally cylindrical configuration, includes a threaded central passage 30 which mates with the threaded boss 12 and is tightened such that an annular seal 32 is sealed against the fixture 10. Passage 30 is a fluid outlet passage and is surrounded by a series of fluid inlet passages 34 (see also FIG. 3) communicating with a chamber 36 connected to receive the product (usually gasoline) from a port 38 in fixture 10. An annular ring 40 formed on the periphery of housing member 28 includes a series of arcuate slots 42 which receive screws 44 for attaching the housing member 28 to a valve body 46. A separate ring 48 has holes for screws 44. This ring which is normally of a harder material than housing member 28, serves to protect housing member 28 from wear and galling as will be explained below.

Valve body 46 is also of generally cylindrical configuration and is secured against a mating face of housing member 28 by means of the screws 44 engaged with threaded holes 45. A plurality of ports 50 in body 46 are aligned with passages 34. A small O-ring seal 52 surrounds each of ports 50 where they contact the adjoining surface of housing member 28. Valve body 46 also has an internal cylindrical surface 54 which overlaps an external cylindrical surface of housing member 26 which contains a groove with an O-ring seal 56 sealing against surface 54. Valve body 46 also includes a centrally located boss 58 which is externally threaded and which includes an internal port 60 aligned with central passage 30. A valve seat 62 is formed on a tapered portion of port 30, against which a check valve member 64 having an O-ring seal 66 is seated. Valve member 64 is urged against its seat by means of a spring 68. A spring retainer 70 carried in an annular shoulder 72 in central passage 30 provides a seat for the opposite end of spring 68. Valve member 64 also includes a guide 74 to insure that it remains in proper alignment and does not become "cocked" or wedged open. As illustrated in phantom, a filter element 14 is threadedly engaged with boss 58. Filter element 14 carries annular seal 26 sealing against a flat surface 76 on valve body 46; as described with respect to FIG. 1.

Figure 4:
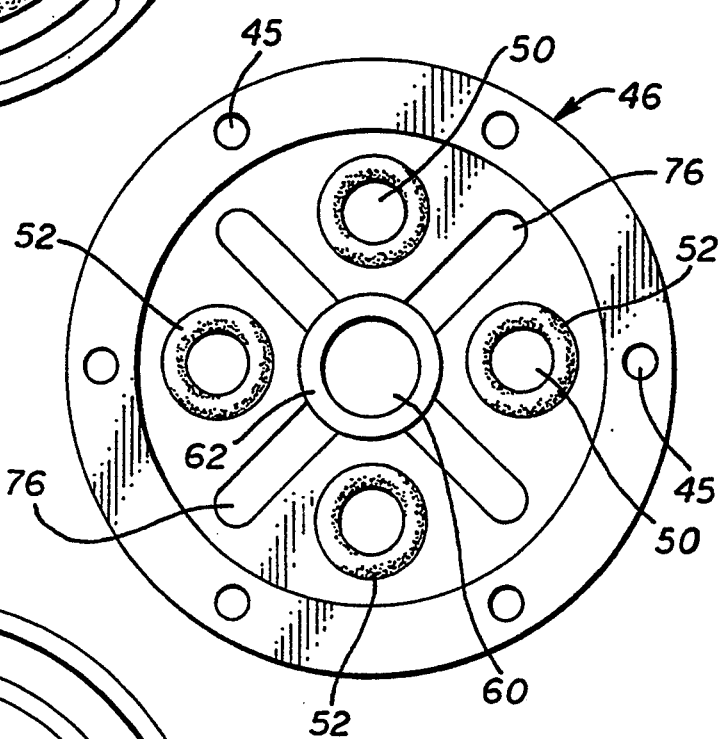
FIG. 4 is a left side elevational view of the valve body of FIG. 2.

FIG. 4 is a left elevational view of the face of valve body 46 shown in FIG. 2. In this view are shown inlet ports 50, the O-ring seals 52 around ports 50, the internal port 60 including the valve seat 62. Interspersed between ports 60 are a plurality of radial passages 76 which communicate with port 60, which is the fluid outlet port from the filter element 14. Also shown are the holes 45 for receiving screws 44.

When the filter element 14 is in operating position, the valve body 46 is aligned with housing member 28 as shown in FIG. 2 and passage 34 and ports 50 are in alignment. When it is desired to remove the filter element, the initial turn of element 14 will turn the valve body 46 relative to housing member 28 because the screws 44 can move in slots 42 an amount sufficient to place passages 34 in registry with radial passages 76. This causes the product to by-pass the filter element 14 and to be directed through radial passages 76 to the outlet passage 30.

Ring 48 is located between the heads of screws 44 and the surface of housing 28 (which would normally be of a relatively soft material like aluminum) to avoid rubbing the screw heads against an aluminum surface. Ring 48 is preferably of a harder material such as brass. When communication to ports 50 is interrupted as described, the pressure in filter element 14 drops to the point where it can no longer hold check valve 64 off its seat. Spring 68 being very light, little pressure remains in the filter element 14. Further turning of the filter element will break the seal between seal 26 and surface 76 and there will be a small leakage of product until the filter element 14 is removed and can be put in a vertical position.

Figure 5:
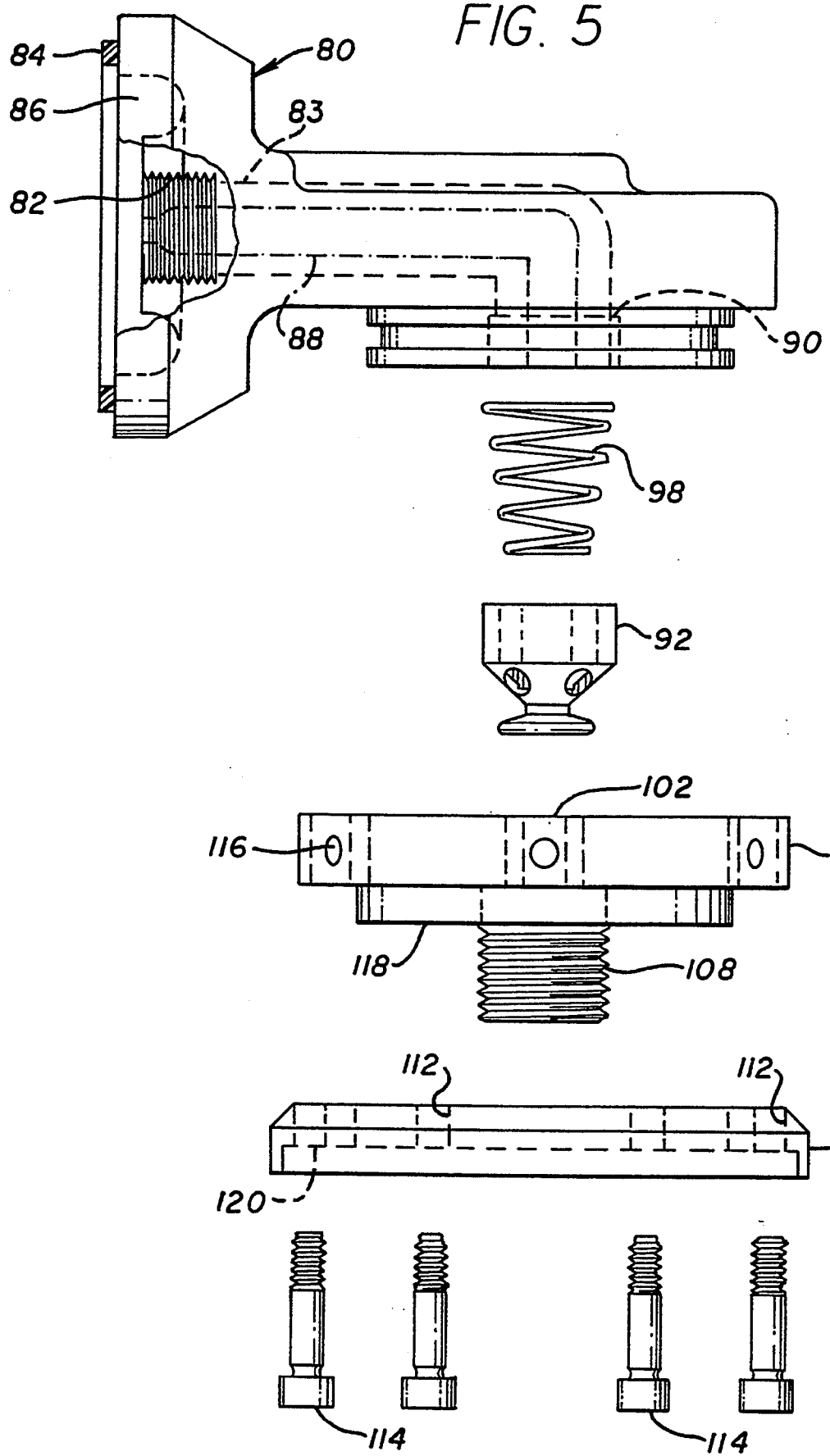
FIG. 5 is an exploded view partly in section of another embodiment of the invention.

To avoid the leakage referred to above, it is preferred to position the filter element 14 vertically so that when it is removed, it will continue to hold the product which it contained at the time that communication with the inlet passages was interrupted. Where the installation in the fuel dispenser mounts the filter element horizontally as shown in FIG. 1, applicants provide another embodiment including a valve and mounting structure which incorporates a 90 degree or right angle bend resulting in a vertical orientation of the filter element. Such an embodiment is shown in FIG. 5 which is an exploded view showing a housing member 80 which has an internally threaded port 82 forming part of a fluid outlet passage 83 and an annular seal 84 for securing against fixture 10. Housing member 80 also includes a chamber 86 which is connected to fluid inlet passages 88, only one of which shows on FIG. 5, the other being directly behind it. As is shown, each of passages 83 and 88 include a ninety degree bend. Outlet passage 83 includes a shoulder 90 constituting a stop for a check valve member 92. Check valve member 92 is urged toward a seat 94 in a valve body 96 by means of a light spring 98 which uses shoulder 90 as a retainer.

Figure 6:
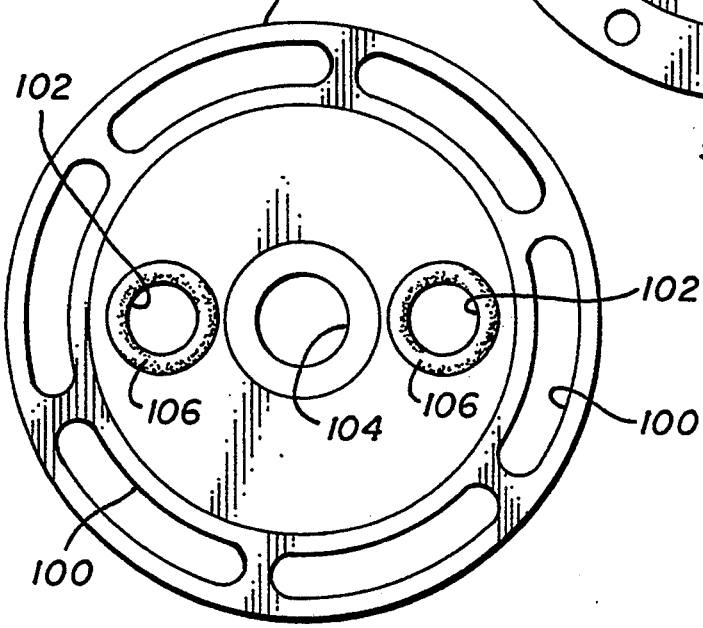
FIG. 6 is a top plan view of the valve body of FIG. 5.

FIG. 6 is a view of the valve body 96 as seen from the top. In this view it will be seen that valve body 96 includes a plurality of arcuate slots 100 which function in the same way as slots 42 of FIG. 3. Fluid inlet passages 88 are normally in registry with ports 102 of FIG. 6 and the central port 104 is in registry with fluid outlet passage 83. A pair of O-ring seals 106 surround each of fluid inlet ports 102 and seal against the outlets of passages 88. The central port 104 terminates in an externally threaded boss 108 (FIG. 5).

Figure 7:
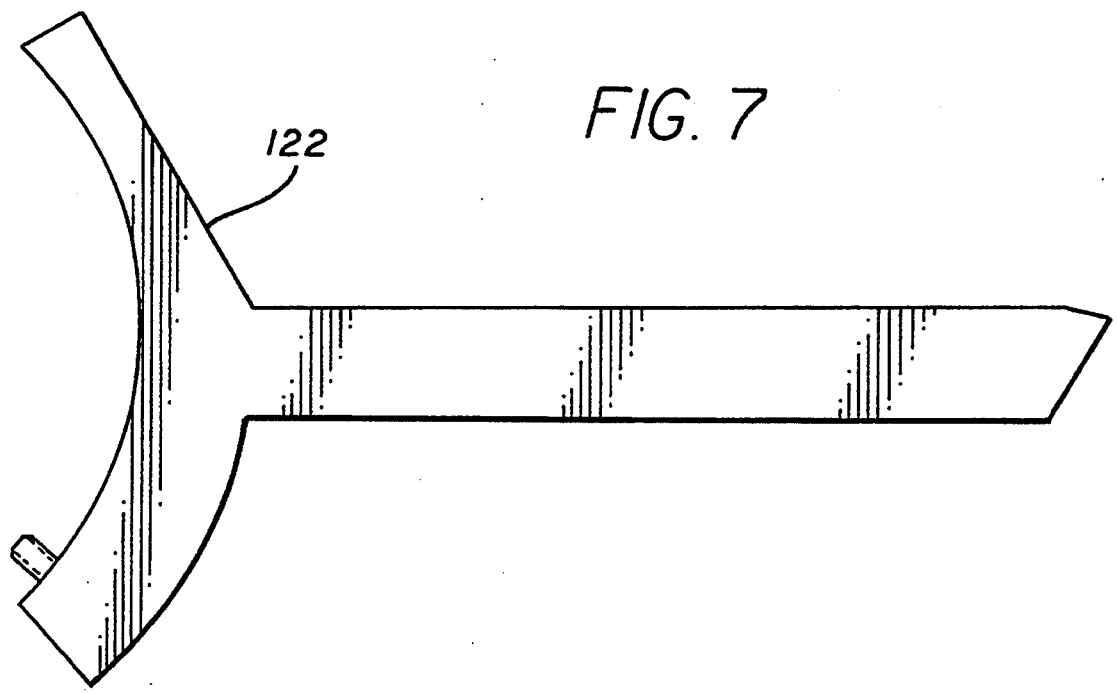
FIG. 7 is a plan view of a wrench to be used with either the embodiment of FIG. 2 or FIG. 5.

Securing valve body 96 to the housing member 80 is a retainer ring 110 which has a plurality of bores 112 for receiving a number of screws 114 which are threaded only at the ends where they engage internally threaded holes (not shown) in housing member 80. A filter element, such as element 14 will screw onto the boss 108 in the same manner described above and seals against the flat surface 118 of valve body 96, which, when assembled, is flush with the surface 120 of retainer ring 110. A number of small bores 116 are drilled around the periphery of valve body 96 which can receive a specialized wrench 122 (FIG. 7) to be used if and when the filter 14 is tightened against the valve body 96 and cannot be removed by hand.

Operation of the embodiment of FIGS. 5 and 6 is similar to that described above. When the filter element 14 is installed, the annular seal 26 seals against face 118 of valve body 96 and screws 114 will be moved along arcuate slots 100 carrying valve body 96 to a position where fluid inlet ports 102 register with inlet passages 88. Fuel will now flow from fixture 10, into inlet chamber 86, through inlet passages 88 and 102, through filter element 14, out through passages 104 and 83, through port 38 in fixture 10 and to the metering unit.

When it is desired to remove the filter element, it is turned an initial amount such as about 45 degrees during which valve body 96 moves relative to housing 80 as screws 114 move in arcuate slots 100. This leaves passages 88 blocked against the surface 118. Again the residual pressure in the filter element 14 will be reduced until spring 98 is able to force check valve 90 onto its seat. Further turning of the filter element 14 will cause it to be separated from boss 108. There may be some slight leakage of the fuel between the check valve 92 and the filter element 14, but it is very slight because the filter element, being maintained in a vertical attitude, will continue to retain all its contents. The filter element and its contents can then be disposed of in an environmentally acceptable manner.

It will be apparent that modifications are possible within the spirit and scope of the present invention. While the horizontally oriented embodiment has been described in connection with the bypassing arrangement and the vertically oriented embodiment with the fuel blocking arrangement, either the by-passing or the blocking arrangement may be used with either the horizontal or vertical filter orientation. Other modifications may be made and we do not desire to be limited other than by the following claims including their equivalents.

What is claimed:

1. For use with a removable filter element:
   a housing adapted to be fixedly mounted;
   fluid inlet passages and a fluid outlet passage formed in said housing, a plurality of arcuate slots arranged in a generally circular pattern on said housing;
   a valve body and fastening means passing through said slots securing said valve body to said housing, said valve body including a threaded boss for attachment of said filter element to said valve body and port means in registry with said fluid inlet passages for supplying fluid to said filter element;
   a passageway through said boss in communication with said fluid outlet passage;
   a check valve in said passageway; and
   seal means positioned between said housing and said valve body, such that turning of said filter element in a direction to remove said element causes an initial rotation of said fastening means in said slots resulting in misalignment of said port means and said fluid inlet passages and blocking flow to said port means.

2. A valve assembly as claimed in claim 1 wherein said valve body includes a plurality of radial passageways communicating said fluid outlet passage with said inlet passages when said filter element is rotated in a direction to remove said element.

3. A valve assembly as claimed in claim 1 wherein said valve body includes a flat annular surface radially outwardly of said port means against which said filter element seals when installed.

4. A valve assembly as claimed in claim 1 wherein said housing includes a cylindrical surface radially outward of said fluid inlet passages, said seal means includes an annular seal in said surface, and said valve body includes a mating cylindrical surface in contact with said annular seal.

5. A valve assembly as claimed in claim 1 wherein said arcuate slots are positioned radially outwardly of said fluid inlet passages.

6. A valve assembly as claimed in claim 1 wherein said housing includes a right angle bend and said fluid inlet passages and said fluid outlet passage also have right angle bends.

7. A valve assembly to be interposed between a source for supplying and receiving fluid under pressure and a removable filter element, said filter element including means sealing against said valve assembly, a plurality of fluid inlet ports and a filter outlet port including threaded attachment means for attachment to said valve assembly, said valve assembly including port means threadedly engaged with said threaded attachment means;
   characterized in that said valve assembly includes a housing including fluid inlet passages and a fluid outlet passage communicating with said source, a seal sealing against said source, and a plurality of arcuate slots positioned radially outwardly of said seal;
   a valve body including said port means, said port means being aligned with said fluid outlet passage, a plurality of ports aligned with said fluid inlet passages, a plurality of threaded holes aligned with said arcuate slots and fasteners passing through said slots and secured to said holes, and seal means between said fluid inlet passages and said ports, such that turning said filter element in a direction to remove it causes said valve body to rotate to a position where said ports are out of alignment with said fluid inlet passages.

8. A valve assembly as claimed in claim 7 herein said housing includes an external cylindrical surface radially outwardly of said fluid inlet passages, said valve body includes a mating internal cylindrical surface, and a seal is interposed between said surfaces.

9. A valve assembly as claimed in claim 7 wherein said valve body includes a plurality of radial passages communicating said fluid output passage with said fluid inlet passages.

10. A valve assembly as claimed in claim 7 wherein rotation of said valve body to misalign said fluid inlet passages and said ports causes said fluid inlet passages to be blocked.

11. A valve assembly as claimed in claim 7 wherein said housing includes a right angle bend and said fluid inlet passages and said fluid outlet passage also have right angle bends.

12. For use with a removable filter element, a valve assembly comprising a housing member including a plurality of arcuate slots arranged in a generally circular pattern, a flat annular surface radially within said slots and having an annular seal in said surface for engaging an opposing surface, a central passage positioned along the axis of the circle defined by said annular surface, a plurality of passages parallel to said central passage and radially positioned between said central passage and said annular seal;
   a valve body of generally cylindrical configuration including a centrally located threaded boss, a central port through said boss in alignment with said central passage, a valve seat in said port, a check valve and resilient means urging said check valve against said valve seat, a plurality of ports in alignment with said plurality of passages, an annular flange located radially outwardly from said plurality of ports, said flange including a flat annular surface, a plurality of threaded sockets in registry with said slots, and screws passing through said slots and threadedly engaged with said sockets to secure said valve body to said housing member;

said filter element being threadedly engagable with said boss and sealing against said flat annular surface whereby rotation of said filter element in a direction to remove said element causes said valve body to be rotated relative to said housing member to misalign said plurality of ports from said plurality of passages.

13. A valve assembly as claimed in claim 12 wherein said valve body includes a plurality of radial passageways communicating said plurality of passages with said central passage when said filter element is rotated in a direction to remove said element.

14. A valve assembly as claimed in claim 12 wherein rotation of said valve body to misalign said plurality of ports from said plurality of passages causes said plurality of passages to be blocked.

15. A valve assembly as claimed in claim 13 wherein said plurality of passageways extend radially outwardly from said central port a distance therefrom approximately equal to the radial distance from said central port to said plurality of ports, said passageways being circumferentially displaced from said plurality of ports by approximately forty-five degrees.

16. A valve assembly as claimed in claim 12 wherein said housing member, said central passage and said plurality of passages all have substantially right angle bends.

* * * * *